US012578429B1

(12) United States Patent
Du et al.

(10) Patent No.: US 12,578,429 B1
(45) Date of Patent: Mar. 17, 2026

(54) RADAR CALIBRATION VALIDATION AND/OR RECALIBRATION

(71) Applicant: Zoox, Inc., Foster City, CA (US)

(72) Inventors: Chao Du, San Mateo, CA (US); Derek Adams, Pasadena, CA (US)

(73) Assignee: Zoox, Inc., Foster City, CA (US)

( * ) Notice: Subject to any disclaimer, the term of this patent is extended or adjusted under 35 U.S.C. 154(b) by 298 days.

(21) Appl. No.: 18/228,435

(22) Filed: Jul. 31, 2023

(51) Int. Cl.
*G01S 7/40* (2006.01)
*G01S 13/931* (2020.01)

(52) U.S. Cl.
CPC .............. *G01S 7/403* (2021.05); *G01S 7/40* (2013.01); *G01S 13/931* (2013.01)

(58) Field of Classification Search
None
See application file for complete search history.

(56) References Cited

U.S. PATENT DOCUMENTS

| | | | | |
|---|---|---|---|---|
| 10,649,459 | B2 | 5/2020 | Wang | |
| 10,830,871 | B2 * | 11/2020 | Blaes | G01S 13/931 |
| 12,189,024 | B1 * | 1/2025 | Fina | G01S 13/931 |
| 2012/0290169 | A1 * | 11/2012 | Zeng | G01S 13/931 |
| | | | | 701/30.2 |

| | | | | |
|---|---|---|---|---|
| 2018/0120414 | A1 * | 5/2018 | Alcalde | G01S 13/931 |
| 2020/0271755 | A1 * | 8/2020 | Wodrich | G01S 13/931 |
| 2020/0278440 | A1 * | 9/2020 | Wang | G01S 13/931 |
| 2021/0341599 | A1 * | 11/2021 | Rozewicz | G01S 13/931 |

FOREIGN PATENT DOCUMENTS

| | | | | |
|---|---|---|---|---|
| EP | 3754359 | A1 * | 12/2020 | G01S 13/931 |

OTHER PUBLICATIONS

U.S. Appl. No. 15/963,833, filed Apr. 26, 2018.
U.S. Appl. No. 16/779,576, filed Jan. 31, 2020.

* cited by examiner

*Primary Examiner* — Bernarr E Gregory
(74) *Attorney, Agent, or Firm* — Lee & Hayes, P.C.

(57) ABSTRACT

Radar sensor alignment validation may ensure a relative position and/or orientation of two or more radar sensors. Radar sensor alignment validation may include determining whether radar data used to determine a sensor alignment is usable for validation and/or determining whether the sensor alignment itself is accurate. This may include iteratively altering a sensor alignment by changing at least one sensor's relative pose, re-determining altered radar data using the altered pose, and determining an updated sensor alignment for the altered radar data. This process may be iterated and metrics may be determined for multiple updated sensor alignments determined this way. These metrics may be used to determine suitability of the underlying radar data for validation and/or an accuracy of the sensor alignment. A validated radar sensor alignment may be used as part of controlling an autonomous vehicle.

20 Claims, 8 Drawing Sheets

200

202

400

RECEIVE CURRENT SENSOR ALIGNMENT 402

RECEIVE RADAR DATA FROM TWO OR MORE RADAR DEVICES 404

D

B

D

DETERMINE ALTERED RADAR DATA 408(A)

AND/OR

SAMPLE RADAR DATA TO DETERMINE SUBSET OF RADAR DATA 408(B)

A

RADAR DATA 406

400

RADAR CALIBRATION VALIDATION AND/OR RECALIBRATION

BACKGROUND

Safety of passengers in a vehicle and other people or objects in proximity to autonomous or semi-autonomous vehicle is often predicated on accurate detection of locations of objects in the environment relative to the vehicle. To safely operate, an autonomous vehicle may include multiple sensors and various systems for detecting and tracking events surrounding the autonomous vehicle and may take these events into account when controlling the autonomous vehicle. These sensors must be calibrated properly to ensure that data they generate is usable by the autonomous vehicle to accurately detect what is happening in the environment and a miscalibration can cause a cascade of faults that may reduce the safety of operation of the autonomous vehicle.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
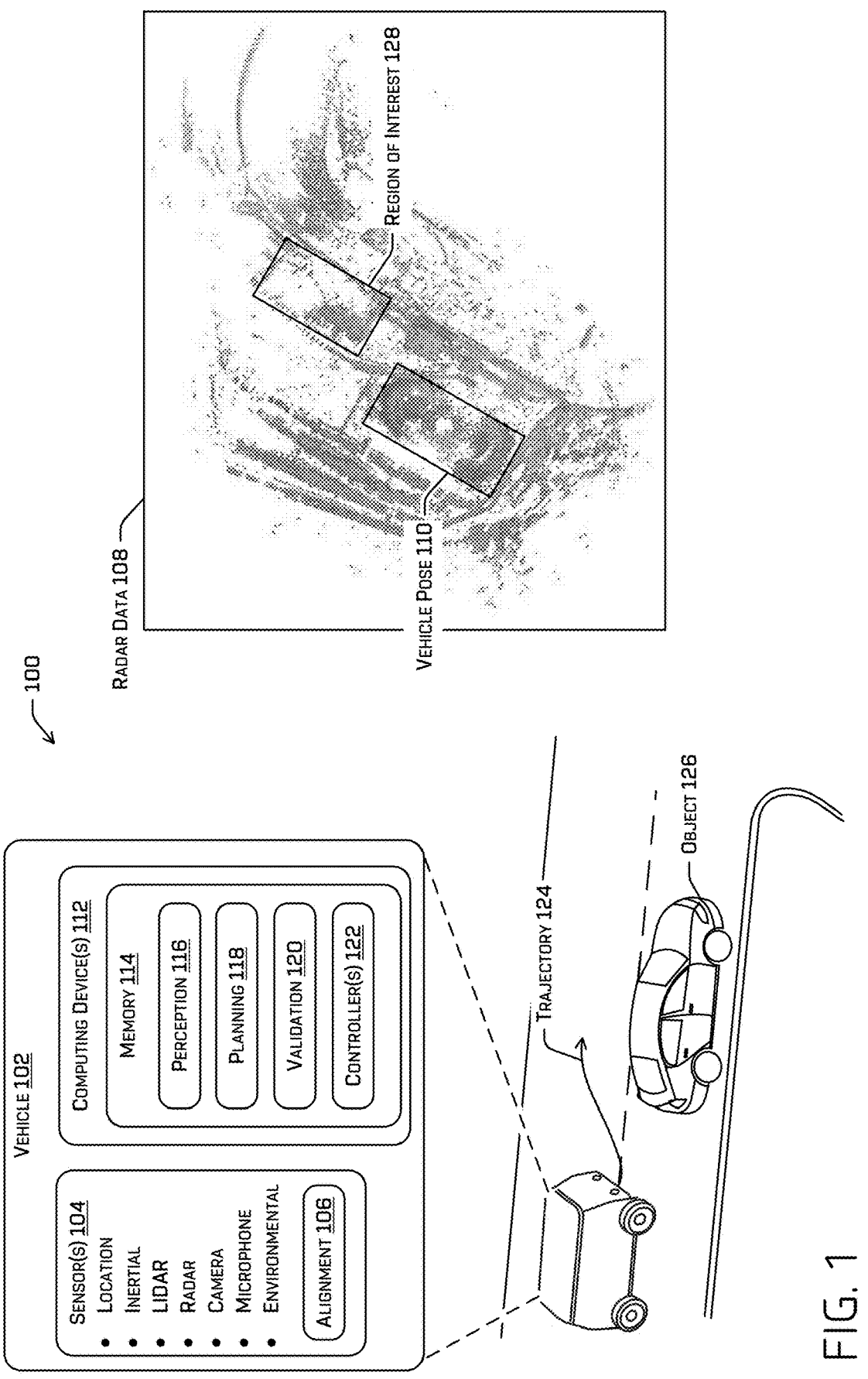
FIG. 1 illustrates an autonomous vehicle and an example scenario in which a radar alignment is used as part of determining operations of an autonomous vehicle.

As discussed above, an autonomous vehicle may include multiple sensors and various systems for detecting and tracking events surrounding the autonomous vehicle and may take these events into account when controlling the autonomous vehicle. These sensors must be calibrated properly to ensure that data they generate is usable by the autonomous vehicle to accurately detect what is happening in the environment, and a miscalibration can cause a cascade of faults that may reduce the safety of operation of the autonomous vehicle. In some examples, the calibration may determine extrinsic characteristics associated with a sensor's pose (i.e., position and/or orientation) relative to a common frame of reference, such as a frame of reference centered on the vehicle, a frame of reference centered on a particular sensor, and/or with reference to other sensors of the same sensor type. For example, a vehicle may include multiple radar sensors and the calibration process may include determining a sensor position and/or orientation of one sensor relative to a vehicle frame of reference and/or one or more other sensors' individual frames of references. This may be done to compensate for slight design deviations or flaws which may otherwise cause the actual position and orientation of a sensor, relative to the common frame of reference, to deviate from the position and orientation intended in the vehicle's design and the sensor placement. Completion of the calibration process may result in an alignment of the sensors such that sensor data from different sensors is collocated in a sensor space or is at least close enough to have an error below a threshold error.

Even though sensors may have already been calibrated, the calibration may not have been successful or calibration drift may occur. Without the techniques discussed herein there may not be a suitable way to identify whether the calibration was successful or whether a current sensor alignment is still accurate. For example, large speed bumps, potholes, vehicle vibrations in the course of operating, and/or impact events, like hail, human-caused, or animal impacts with a sensor may cause the sensor alignment to no longer be accurate. Practically, this means that if a sensor was originally positioned and oriented in a particular manner and this position and orientation shifts suddenly or over time, the vehicle may continue to process sensor data from that sensor in a manner that is predicated on the original position and orientation of that sensor relative to the common frame of reference indicated by the original sensor alignment. This may cause a degradation in the accuracy of downstream systems, such as a perception component, planning component, and/or localization component of the vehicle, which may cause such components' outputs to be inaccurate or cause the components to be incapable of creating a usable output.

The techniques (e.g., hardware and/or software, processes) described herein include a validation process that ensures that a radar calibration achieves a satisfactory level of coherency and/or that no calibration drift has occurred. In some examples, the techniques may be used to detect when a re-calibration may be necessary and, if the sensor alignment is no longer valid (e.g., the alignment is indicated as being invalid as determined by the validation techniques discussed herein or exceeds a threshold), the validation component may trigger a re-calibration of the sensor alignment and/or otherwise cause the sensor alignment to be modified.

The techniques discussed herein may include receiving a current sensor alignment, which may indicate the relative positions and orientations of multiple radar sensors associated with a vehicle. In some examples, the techniques may include determining whether radar data used for a validation attempt is suitable for validation and/or determining whether the current sensor alignment is accurate. The current sensor alignment may be an initial sensor alignment or last iteration of a sensor alignment that is part of an iteration loop for modifying the sensor alignment to decrease the error associated with the sensor alignment. The techniques may include receiving log data comprising radar data generated by different radar devices over a time period and altering the current sensor alignment by changing at least one sensor's relative position and/or orientation to determine an altered sensor alignment. Since the radar data received as part of the log data may be predicted on the current sensor alignment, the techniques may include determining altered radar data based at least in part on the altered sensor alignment. This may include altering a relative position and/or orientation of a subset of radar data that was received from a radar device for which the radar device position and/or orientation was altered.

The techniques may include determining an updated sensor alignment for the altered radar data as part of a simulation, such as a Monte Carlo simulation. For example, this may include running a recalibration or optimization to determine an updated sensor alignment. In some examples, determining the updated sensor alignment may be based at least in part on determining a Renyi's quadratic entropy (RQE) for the altered radar data as part of the recalibration or optimization process.

The techniques may determine multiple of these updated sensor alignments by repeatedly altering the current sensor alignment (e.g., by altering a single sensor multiple ways and/or by iteratively altering different sensor poses and/or positions) and determining updated sensor alignments from the resultant altered sensor data. For example, this process may be iterated hundreds or thousands of times. The validation process may then include determining metric(s) for characteristics of the updated sensor alignments. In some examples, these metric(s) may be based at least in part on the RQE determination for each of the updated sensor alignments or may be determined based at least in part on characteristics of the updated sensor alignments, such as the relative positions and/or orientations of the sensors indicated by the updated sensor alignments. For example, the metric(s) may include a standard deviation or variance and/or bias of the positions and/or orientations indicated by the updated sensor alignments.

These metric(s) may be used to determine a suitability of the radar data for validation and/or a validity of the sensor alignment. For example, the standard deviation or variance may be used as a confidence interval and the techniques may include determining that the radar data is unsuitable for use to validate the current sensor alignment if the standard deviation or variance meets or exceeds a threshold standard deviation or variance. In such a case, the high standard deviation or variance may indicate that there wasn't enough radar data or that the radar data was corrupted, associated with a portion of the environment that included highly variable features, and/or that features of the radar data itself makes it difficult or impossible to use for validation. Regardless, if the techniques determine that the radar data is unsuitable for validation, the techniques may retrieve collect or retrieve from log data additional radar data and re-attempt the validation for the additional radar data by determining new altered radar data with the additional radar data, re-determining updated sensor alignments, and re-determining the metric(s) associated with the updated sensor alignments. Additionally or alternatively, the techniques may include collecting or retrieving new radar data to replace the former radar data and re-executing the validation operations. In some examples, the techniques may track how many of these re-attempts are made and may, after a threshold number of re-attempts are made, indicate that the current sensor alignment cannot currently be validated. In such an instance, a vehicle that uses the current sensor alignment may be rerouted for maintenance or rerouted to a safe stopping position. However, if the standard deviation or variance is below a threshold standard deviation or variance, the techniques may output an indication that the radar data is suitable for validation.

In some examples, the techniques may determine a bias based at least in part on a difference between a position and/or orientation of a sensor indicated in the current sensor alignment and a mean position and/or orientation of the sensor determined from the updated sensor alignments. If the bias meets or exceeds a threshold bias, the techniques may include determining that the current sensor alignment is invalid. Such an indication may mean that the current sensor alignment is inaccurate and accordingly inadequate for continued operation of a vehicle (or, in some examples, data from that sensor) using that alignment. In some examples, a mean position(s) and/or orientation(s) of the updated sensor alignments may be used to replace the position(s) and/or orientation(s) indicated in the current sensor alignment for one or more sensors, as a modified sensor alignment. This modified sensor alignment may then be used by the vehicle as at least part of controlling operation of the vehicle. However, if the bias is below a threshold bias, the techniques may output an indication that the current sensor alignment is valid. In such a case, the vehicle may use the current sensor alignment as at least part of controlling operation of the vehicle. Determining that the current sensor alignment is valid may additionally or alternatively be based at least in part on determining that the radar data is suitable for validation, such as by determining that the standard deviation or variance is below a threshold standard deviation or variance.

The techniques discussed herein may increase the safety of operations of the vehicle by increasing the accuracy of the sensor data upon which perception data is generated. This, in turn, improves the accuracy and reliability of the perception data, which may be used by a planning component of the vehicle to determine an operation for controlling the vehicle. As such, the operation determined by the vehicle may be safer and more efficient for navigating the environment. The techniques are also robust to initial validation failures, such as determining that the radar data is unsuitable for validation, as a result of the various validation re-attempt operations discussed herein.

Example Scenario

FIG. 1 illustrates an example scenario 100 including a vehicle 102. In some instances, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc. Moreover, even though the vehicle 102 is depicted as a land vehicle, vehicle 102 may be an aircraft, spacecraft, watercraft, and/or the like.

According to the techniques discussed herein, the vehicle 102 may receive sensor data from sensor(s) 104 of the vehicle 102. For example, the sensor(s) 104 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), odometry sensor (which may be determined based at least in part on inertial measurements and/or an odometer of the vehicle 102), a depth position sensor (e.g., a lidar sensor, a radar sensor, a sonar sensor, a time of flight (ToF) camera, a depth camera, an ultrasonic and/or sonar sensor), an image sensor (e.g., a visual light camera, infrared camera), an audio sensor (e.g., a microphone), and/or environmental sensor (e.g., a barometer, a hygrometer, etc.).

For those sensor modalities that include two or more sensors on the vehicle, such sensors may be associated with a sensor alignment 106 that identifies a relative position and/or orientation of each of the sensors of that modality type (either between one another and/or relative to a common reference position). For example, a relative position may identify a translation of a sensor relative to a common frame of reference, such as a vehicle frame of reference, and the orientation may identify an orientation of the sensor relative to the common frame of reference. This may be necessary, as sensors and/or the placement on the vehicle 102 may vary slightly from their design specifications and/or due to wear and tear, environmental conditions such as contraction and expansion due to weather conditions, and events such as impact events or on-vehicle vibration. Additionally or alternatively, the sensor alignment 106 may identify a position and/or orientation of a sensor relative to a vehicle frame of reference. In at least one example, the sensor alignment 106 may identify a relative position and/or orientation of radar devices mounted on or otherwise affixed to the vehicle 102.

The sensor(s) 104 may generate sensor data, which may include radar data 108 of an environment surrounding the vehicle. Radar data 108 may be a depiction of radar data aggregated from multiple radar devices of the vehicle 102 according to the sensor alignment 106. The sensor alignment 106 may be used to define how different subsets of radar data from different radar devices may be overlaid over each other. For example, a relative position and/or orientation of a radar sensor may be used to determine where in the environment the surface is that reflected the light emitted by a radar sensor. This relative position and/or orientation is indicated by the sensor alignment 106. As such, the sensor alignment 106 will end up dictating where a radar return or radar point is determined to exist in the environment and changes to that radar device's pose in the sensor alignment 106 will change where it is estimated that this surface exists in the environment. In some examples, radar data may comprise a range (i.e., distance) to an object and/or a Doppler value (i.e., velocity) associated with the object and, unlike lidar data, may be substantially two-dimensional or may include returns within a comparatively narrow vertical field of view (e.g., altitude of 5 degrees, 10 degrees, 20 degrees). A position 110 of the vehicle 102 is indicated using a rectangle in the radar data 108 to give a sense of orientation of the radar data 108. As can be seen from the radar data 108, the amount of data received from the radar devices may make it very difficult to properly calibrate the radar data.

Computing device(s) 112 may comprise a memory 114 storing a perception component 116, a planning component 118, a validation component 120 that may carry out the techniques discussed herein, and/or controller(s) 122. In some examples, the perception component 116 may additionally or alternatively include a prediction component (unillustrated in FIG. 1 but illustrated in FIG. 2) and/or a simultaneous localization and mapping (SLAM) component (unillustrated in FIG. 1 but illustrated in FIG. 2), although either of these components may be their own separate component.

The validation component 120 may carry out the techniques described herein to validate and/or trigger modification to the sensor alignment 106 as discussed herein.

In general, the perception component 116 may determine what is in the environment surrounding the vehicle 102 and the planning component 118 may determine how to operate the vehicle 102 according to information received from the perception component 116. For example, the planning component 118 may determine trajectory 124 for controlling the vehicle 102 based at least in part on the perception data and/or other information such as, for example, one or more maps, prediction data, localization information (e.g., where the vehicle 102 is in the environment relative to a map and/or features detected by the perception component 116), and/or the like.

The trajectory 124 may comprise instructions for controller(s) 122 to actuate drive components of the vehicle 102 to effectuate a steering angle, steering rate, acceleration, and/or the like, which may result in a vehicle position, vehicle velocity, and/or vehicle acceleration. For example, the trajectory 124 may comprise a target heading, target steering angle, target steering rate, target position, target velocity, and/or target acceleration for the controller(s) 122 to track. In some examples, the trajectory 124 may be associated with controls sufficient to control the vehicle 102 over a time horizon (e.g., 5 milliseconds, 10 milliseconds, 100 milliseconds, 200 milliseconds, 0.5 seconds, 1 second, 2 seconds, etc.) or a distance horizon (e.g., 1 meter, 2 meters, 5 meters, 8 meters, 10 meters). In some examples, the controller(s) 122 may comprise software and/or hardware for actuating drive components of the vehicle 102 sufficient to track the trajectory 124. For example, the controller(s) 122 may comprise one or more proportional-integral-derivative (PID) controllers to control vehicle 102 to track trajectory 124.

FIG. 1 depicts an example of such a trajectory 124, represented as an arrow indicating a heading, velocity, and/or acceleration, although the trajectory itself may comprise instructions for a controller, which may, in turn, actuate a drive system of the vehicle 102. For example, the trajectory 124 may comprise instructions for controller(s) 122 of the vehicle 102 to actuate drive components of the vehicle 102 to effectuate a steering angle and/or steering rate, which may result in a vehicle position, vehicle velocity, and/or vehicle acceleration (or a simulated version thereof when the autonomous vehicle is being simulated). The trajectory 124 may comprise a target heading, target steering angle, target steering rate, target position, target velocity, and/or target acceleration for the controller(s) to track.

In some examples, the perception component 116 may receive sensor data from the sensor(s) 104 and determine data related to objects in the vicinity of the vehicle 102 (e.g., classifications associated with detected objects, instance segmentation(s), semantic segmentation(s) (e.g., identifying a portion of sensor data as being associated with a semantic classification), two and/or three-dimensional bounding boxes, tracks), route data that specifies a destination of the vehicle, global map data that identifies characteristics of roadways (e.g., features detectable in different sensor modalities useful for localizing the autonomous vehicle), a pose of the vehicle (e.g. position and/or orientation in the environment, which may be determined by or in coordination with a localization component), local map data that identifies characteristics detected in proximity to the vehicle (e.g., locations and/or dimensions of buildings, trees, fences, fire hydrants, stop signs, and any other feature detectable in various sensor modalities), etc.

In particular, the perception component 116 may determine, based at least in part on sensor data, an object detection indicating an association of a portion of sensor data with an object in the environment. The object detection may indicate an object classification, sensor data segmentation (e.g., mask, instance segmentation, semantic segmentation), a region of interest (ROI) identifying a portion of sensor data associated with the object, object classification, and/or a confidence score indicating a likelihood (e.g., posterior probability) that the object classification, ROI, pose (i.e., position and heading), velocity, acceleration, and/or sensor data segmentation is correct/accurate (there may be confidence score generated for each in some examples). For example, the ROI may include a portion of an image or radar data identified by an ML model or ML pipeline of the perception component 116 as being associated with the object, such as using a bounding box, mask, an instance segmentation, and/or a semantic segmentation. The object classifications determined by the perception component 116 may distinguish between different object types such as, for example, a passenger vehicle, a pedestrian, a bicyclist, a delivery truck, a semi-truck, traffic signage, and/or the like.

To give a concrete example, the vehicle 102 may receive sensor data including image data (from one or more image sensors) and/or other sensor data associated with the environment, such as lidar data, radar data, ToF data, and/or the like. The perception component may detect and classify objects in the environment using any of this sensor data or a combination thereof. For example, the perception component may detect dynamic objects, such as a cyclist, vehicle, pedestrian, or the like, and/or static objects, such as poles, traffic signage, general signage, a drivable surface, sidewalk, public furniture, building, etc. In the depicted example, the perception component 116 may determine, based at least in part on sensor data, an object detection associated with object 126, a vehicle. In some examples, the object detection determined for object 126 may comprise a region of interest 128 determined based at least in part on radar data 108. The object detection generated by the perception component 116 may additionally or alternatively include other types of perception data discussed herein that may be based at least in part on the radar data 108 or other sensor data received from other sensor modalities.

In some examples, the perception component 116 may additionally or alternatively determine a likelihood that a portion of the environment is occluded to one or more sensors and/or which particular sensor types of the vehicle. For example, a region may be occluded to a camera but not to radar or, in fog, a region may be occluded to the radar sensors but not to cameras or lidar to the same extent.

In some examples, any of this data determined by the perception component 116 may be indicated in a top-down representation of the environment. The top-down representation may comprise a data structure, such as a multi-channel image, where different channels of the image identify the existence, absence, or quality of a characteristic of the environment, as determined by the perception component based at least in part on sensor data received by the vehicle. For example, a portion of the top-down representation, such as a pixel, may indicate, depending on the channel of the image, the presence of an object at a location in the environment associated with that portion, an object classification of the object (e.g., one channel may indicate that presence or absence of a cyclist or a portion of a cyclist at a particular location in the environment), object heading, object velocity, map data (e.g., existence of a sidewalk, existence of and/or direction of travel associated with a roadway, signage location(s) and/or states, static object locations and/or classifications), and/or the like. Determining a top-down representation is discussed in more detail in U.S. Pat. No. 10,649,459, issued May 12, 2020, which is incorporated in its entirety herein for all purposes, and/or a top-down prediction associated with the environment, as described in more detail in U.S. patent application Ser. No. 16/779,576, filed Jan. 31, 2020, now U.S. Pat. No. 12,012, 127, which is incorporated in its entirety herein for all purposes.

In some examples, object detections may be tracked over time. The perception component 116 and/or prediction component may determine a track to associate with an object. For example, a track may associate two object detections generated at two different times as being associated with a same object and may comprise a historical, current, and/or predicted object position, orientation, velocity, acceleration, and/or other state (e.g., door state, turning state, intent state such as signaling turn) of that object. The predicted portion of a track may be determined by the prediction component, in some examples.

The data produced by the perception component 116 may be collectively referred to as perception data. Once the perception component 116 has generated perception data, the perception component 116 may provide the perception data to a prediction component and/or the planning component 118. In an example where prediction data generated by the prediction component is used to generate a track, the perception component may also output such data to the planning component 118.

In some examples, the prediction component may receive sensor data and/or perception data and may determine a predicted state of dynamic objects in the environment. In some examples, dynamic objects may include objects that move or change states in some way, like traffic lights, moving bridges, train gates, and the like. The prediction component may use such data to a predict a future state, such as a signage state, position, orientation, velocity, acceleration, or the like, which collectively may be described as prediction data. For example, the prediction component may determine a prediction associated with object 126 indicating a predicted future position, orientation, velocity, acceleration, and/or state of object 126. In some examples, the prediction component may comprise a pipeline of hardware and/or software, which may include one or more GPU(s), ML model(s), Kalman filter(s), and/or the like.

The planning component 118 may use the perception data received from perception component 116 and/or prediction data received from the prediction component, to determine one or more trajectories, control motion of the vehicle 102 to traverse a path or route, and/or otherwise control operation of the vehicle 102, though any such operation may be performed in various other components (e.g., localization may be performed by a localization component, which may be based at least in part on perception data). The planning component 118 may use the perception data and/or prediction data to determine a route for the vehicle 102 from a first location to a second location; generate, substantially simultaneously and based at least in part on the perception data and/or simulated perception data (which may further include predictions regarding detected objects in such data), a plurality of candidate trajectories for controlling motion of the vehicle 102 in accordance with a receding horizon technique (e.g., 1 micro-second, half a second) to control the vehicle to traverse the route (e.g., in order to avoid any of the detected objects); and select one of the candidate trajectories as a trajectory 124 of the vehicle 102 that may be used to generate a drive control signal that may be transmitted to drive components of the vehicle 102.

The sensor data, perception data, prediction data, planning data, and/or any other computational outputs determined by component(s) of the vehicle 102 may be stored in association with the sensor data as log data. This log data may be transmitted to a remote computing device (unillustrated in FIG. 1 for clarity) for use in calibrating the sensors to determine the sensor alignment 106. Additionally or alternatively, the log data may comprise at least the sensor data and may be used for calibrating the sensors on the vehicle, as opposed to remotely.

Example System

Figure 2:
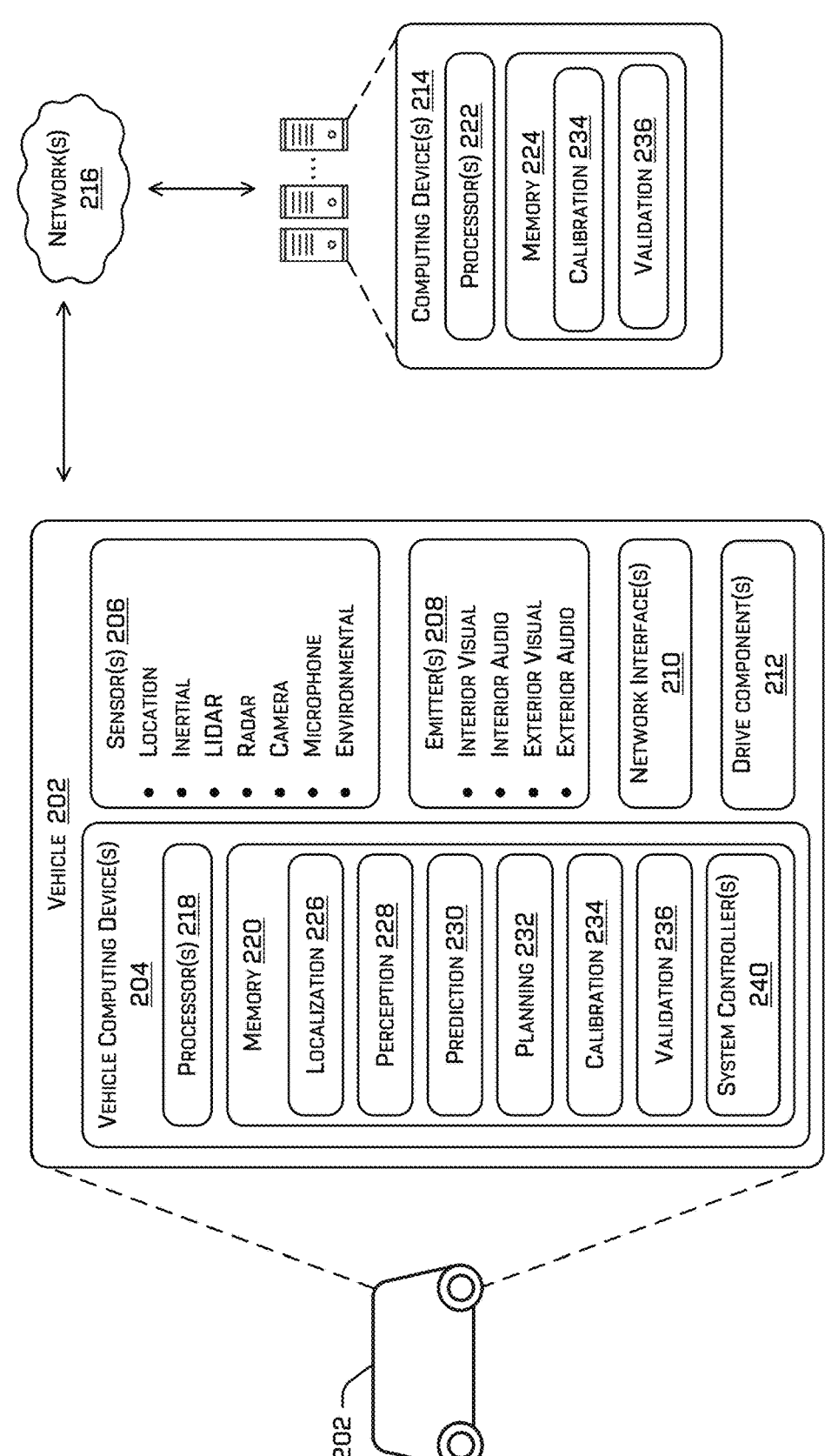
FIG. 2 illustrates a block diagram of an autonomous vehicle comprising a calibration component and sensor alignment validation component.

FIG. 2 illustrates a block diagram of an example system 200 that implements the techniques discussed herein. In some instances, the example system 200 may include a vehicle 202, which may represent the vehicle 102 in FIG. 1. In some instances, the vehicle 202 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 202 may be a fully or partially autonomous vehicle having any other level or classification. Moreover, in some instances, the techniques described herein may be usable by non-autonomous vehicles as well.

The vehicle 202 may include a vehicle computing device(s) 204, sensor(s) 206, emitter(s) 208, network interface(s) 210, and/or drive component(s) 212. Vehicle computing device(s) 204 may represent computing device(s) 112 and sensor(s) 206 may represent sensor(s) 104. The system 200 may additionally or alternatively comprise computing device(s) 214.

The sensor(s) 206 may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 206 may include multiple instances of each of these or other types of sensors. For instance, the radar sensors may include individual radar sensors located at the corners, front, back, sides, and/or top of the vehicle 202. As another example, the cameras may include multiple cameras disposed at various locations about the exterior and/or interior of the vehicle 202. The sensor(s) 206 may provide input to the vehicle computing device(s) 204 and/or to computing device(s) 214. The position associated with a simulated sensor, as discussed herein, may correspond with a position and/or point of origination of a field of view of a sensor (e.g., a focal point) relative the vehicle 202 and/or a direction of motion of the vehicle 202.

The vehicle 202 may also include emitter(s) 208 for emitting light and/or sound, as described above. The emitter(s) 208 in this example may include interior audio and visual emitter(s) to communicate with passengers of the vehicle 202. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 208 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 202 may also include network interface(s) 210 that enable communication between the vehicle 202 and one or more other local or remote computing device(s). For instance, the network interface(s) 210 may facilitate communication with other local computing device(s) on the vehicle 202 and/or the drive component(s) 212. Also, the network interface(s) 210 may additionally or alternatively allow the vehicle to communicate with other nearby computing device(s) (e.g., other nearby vehicles, traffic signals, etc.). The network interface(s) 210 may additionally or alternatively enable the vehicle 202 to communicate with computing device(s) 214. In some examples, computing device(s) 214 may comprise one or more nodes of a distributed computing system (e.g., a cloud computing architecture).

The network interface(s) 210 may include physical and/or logical interfaces for connecting the vehicle computing device(s) 204 to another computing device or a network, such as network(s) 216. For example, the network interface(s) 210 may enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device(s) 204 and/or the sensor(s) 206 may send sensor data, via the network(s) 216, to the computing device(s) 214 at a particular frequency, after a lapse of a predetermined period of time, in near real-time, etc.

In some instances, the vehicle 202 may include one or more drive components 212. In some instances, the vehicle 202 may have a single drive component 212. In some instances, the drive component(s) 212 may include one or more sensors to detect conditions of the drive component(s) 212 and/or the surroundings of the vehicle 202. By way of example and not limitation, the sensor(s) of the drive component(s) 212 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 212. In some cases, the sensor(s) on the drive component(s) 212 may overlap or supplement corresponding systems of the vehicle 202 (e.g., sensor(s) 206).

The drive component(s) 212 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 212 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 212. Furthermore, the drive component(s) 212 may also include one or more communication connection(s) that enable communication by the respective drive component with one or more other local or remote computing device(s).

The vehicle computing device(s) 204 may include processor(s) 218 and memory 220 communicatively coupled with the one or more processors 218. Memory 220 may represent memory 114. Computing device(s) 214 may also include processor(s) 222, and/or memory 224. Memory 220 and/or 224 may store processor-executable instructions that, when executed by one or more processors, e.g., processor(s) 218 and/or 222, cause a system to perform various operations discussed herein. The processor(s) 218 and/or 222 may be any suitable processor capable of executing instructions to process data and perform operations as described herein. By way of example and not limitation, the processor(s) 218 and/or 222 may comprise one or more central processing units (CPUs), graphics processing units (GPUs), tensor processing units (TPUs), data processing units (DPUs), integrated circuits (e.g., application-specific integrated circuits (ASICs)), gate arrays (e.g., field-programmable gate arrays (FPGAs)), artificial intelligence (AI) hardware and/or accelerator (which may be any one or more of the previous processors or a stand-alone purpose designed chip) and/or any other device or portion of a device that processes electronic data to transform that electronic data into other electronic data that may be stored in registers and/or memory.

Memory 220 and/or 224 may be examples of non-transitory computer-readable media. The memory 220 and/or 224 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), double data rate synchronous dynamic random-access memory (DDR SDRAM), hard disk drive (HDD), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 220 and/or memory 224 may store a localization component 226, perception component 228, prediction component 230, planning component 232, calibration component 234, validation component 236, and/or system controller(s) 240 zero or more portions of any of which may be hardware, such as GPU(s), CPU(s), TPU(s), FPGA(s), and/or other processing units. Perception component 228 may represent perception component 116, prediction component 230 may represent perception component, planning component 232 may represent planning component 118, validation component 236 may represent validation component 120, and controller(s) 240 may represent controller(s) 122.

In at least one example, the localization component 226 may include hardware and/or software to receive data from the sensor(s) 206 to determine a position, velocity, and/or orientation of the vehicle 202 (e.g., one or more of an x-, y-, z-position, roll, pitch, or yaw). For example, the localization component 226 may include and/or request/receive map(s) of an environment and can continuously determine a location, velocity, and/or orientation of the autonomous vehicle within the map(s). In some instances, the localization component 226 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 226 may provide data to various components of the vehicle 202 to determine an initial position of an autonomous vehicle for generating a trajectory and/or for generating map data. In some examples, localization component 226 may provide, to the perception component 228 and/or prediction component 230, a location and/or orientation of the vehicle 202 relative to the environment and/or sensor data associated therewith.

In some instances, perception component 228 may comprise a primary perception system and/or a prediction system implemented in hardware and/or software. The perception component 228 may detect object(s) in in an environment surrounding the vehicle 202 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. The perception component 228 may include a prediction component that predicts actions/states of dynamic components of the environment, such as moving objects, although the prediction component may be separate, as in the illustration. In some examples, the perception component 228 may determine a top-down representation of the environment that encodes the position(s), orientation(s), velocity(ies), acceleration(s), and/or other states of the objects in the environment. For example, the top-down representation may be an image with additional data embedded therein, such as where various pixel values encode the perception data discussed herein.

The prediction component 230 may predict a future state of an object in the environment surrounding the vehicle 202. For example, the future state may indicate a predicted object position, orientation, velocity, acceleration, and/or other state (e.g., door state, turning state, intent state such as signaling turn) of that object. Data determined by the prediction component 230 is referred to as prediction data. In some examples, the prediction component 230 may determine a top-down representation of a predicted future state of the environment. For example, the top-down representation may be an image with additional data embedded therein, such as where various pixel values encode the prediction data discussed herein.

The planning component 232 may receive a location and/or orientation of the vehicle 202 from the localization component 226 and/or perception data from the perception component 228 and may determine instructions for controlling operation of the vehicle 202 based at least in part on any of this data. In some examples, the memory 220 may further store map data, which is undepicted, and this map data may be retrieved by the planning component 232 as part of generating the environment state data discussed herein. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic, such as may be generated by system controller(s) of the drive component(s) 212)) that the drive component(s) 212 may parse/cause to be carried out, second instructions for the emitter(s) 208 may be formatted according to a second format associated therewith). In some examples, where the planning component 232 may comprise hardware/software-in-a-loop in a simulation (e.g., for testing and/or training the planning component 232), the planning component 232 may generate instructions which may be used to control a simulated vehicle. These instructions may additionally or alternatively be used to control motion of a real-world version of the vehicle 202, e.g., in instances where the vehicle 202 runs the simulation runs on vehicle during operation.

The calibration component 234 may determine an intrinsic calibration of a sensor, which may calibrate internal functions of the sensor to ensure the data generated thereby is accurate with reference to the sensor itself. Additionally or alternatively, the calibration component 234 may determine an extrinsic calibration of a group of sensors, resulting in the sensor alignment discussed herein. The extrinsic sensor alignment may identify a position and/or orientation of a sensor relative to a common frame of reference, such as a frame of reference centered on the vehicle and/or to the other sensors of the same modality. The calibration component 234 may comprise an optimization algorithm for iteratively improving the sensor alignment, which may be used in combination with the validation component 236 discussed herein. For example, the validation component 236 may be used to determine a measure of the quality of the sensor alignment, indicated using the metric(s) discussed herein, and the calibration component 234 may modify the sensor alignment responsive to determining that a prior calibration failed.

The validation component 236 may comprise software and/or hardware for validating a sensor alignment according to the techniques discussed herein. The validation component 236 may execute following an initial calibration of the vehicle's sensors. Additionally or alternatively, the validation component 236 may execute based at least in part on detecting an event, such as a passage of time since a last validation of the sensor alignment, receiving sensor data and/or perception data indicative of the occurrence of an event (e.g., IMU data associated with the vehicle as a whole or an individual sensor that indicates inertial movement above a threshold inertial movement; detection of an impact event with an individual sensor, a region of the vehicle including a sensor, or an impact with any area of the vehicle), and/or the like. In some examples, upon determining that the sensors are out of alignment, the validation component may trigger the calibration component 234 to modify the sensor alignment to realign the sensors. For vehicles that are actively operating, rather than merely being produced or tested, if upon iteratively using the calibration component 234 to modify the sensor alignment and the modified sensor alignment does not result in an alignment that passes the validation process discussed herein, the vehicle 202 may be caused to stop, transmit a request for assistance to a teleoperations device, or plan a route to a maintenance hub. In other examples where the sensor alignment is still valid, the validation component 236 may output an indication that the sensor alignment is valid, which may be used for auditing, and/or assurance that the vehicle 202 can continue to operate using the sensor alignment.

The memory 220 and/or 224 may additionally or alternatively store a mapping system, a planning system, a ride management system, simulation/prediction component, etc.

As described herein, the localization component 226, the perception component 228, the prediction component 230, the planning component 232, and/or other components of the system 200 may comprise one or more ML models. For example, localization component 226, the perception component 228, the prediction component 230, and/or the planning component 232 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), random forest), SVM (support vector machine), supervised learning, unsupervised learning, semi-supervised learning, etc. Additional examples of architectures include neural networks such as ResNet-50, ResNet-101, VGG, DenseNet, PointNet, Xception, ConvNeXt, and the like; visual transformer(s) (ViT(s)), such as a bidirectional encoder from image transformers (BEiT), visual bidirectional encoder from transformers (VisualBERT), image generative pre-trained transformer (Image GPT), data-efficient image transformers (DeiT), deeper vision transformer (DeepViT), convolutional vision transformer (CvT), detection transformer (DETR), Miti-DETR, or the like; and/or general or natural language processing transformers, such as BERT, RoBERTa, XLNet, GPT, GPT-2, GPT-3, or the like. In some examples, the ML model discussed herein may comprise PointPillars, SECOND, top-down feature layers (e.g., see U.S. patent application Ser. No. 15/963,833, filed Apr. 26, 2018, now U.S. Pat. No. 10,649,459, which is incorporated by reference in its entirety herein for all purposes), and/or VoxelNet. Architecture latency optimizations may include MobilenetV2, Shufflenet, Channelnet, Peleenet, and/or the like. The ML model may comprise a residual block such as Pixor, in some examples.

Memory 220 may additionally or alternatively store one or more system controller(s) (which may be a portion of the drive component(s)), which may be configured to control steering, propulsion, braking, safety, emitters, communication, and other systems of the vehicle 202. These system controller(s) may communicate with and/or control corresponding systems of the drive component(s) 212 and/or other components of the vehicle 202. For example, the planning component 232 may generate instructions based at least in part on perception data generated by the perception component 228 and/or simulated perception data and transmit the instructions to the system controller(s), which may control operation of the vehicle 202 based at least in part on the instructions.

It should be noted that while FIG. 2 is illustrated as a distributed system, in alternative examples, components of the vehicle 202 may be associated with the computing device(s) 214 and/or components of the computing device(s) 214 may be associated with the vehicle 202. That is, the vehicle 202 may perform one or more of the functions associated with the computing device(s) 214, and vice versa.

Example Radar Data

Figure 3:
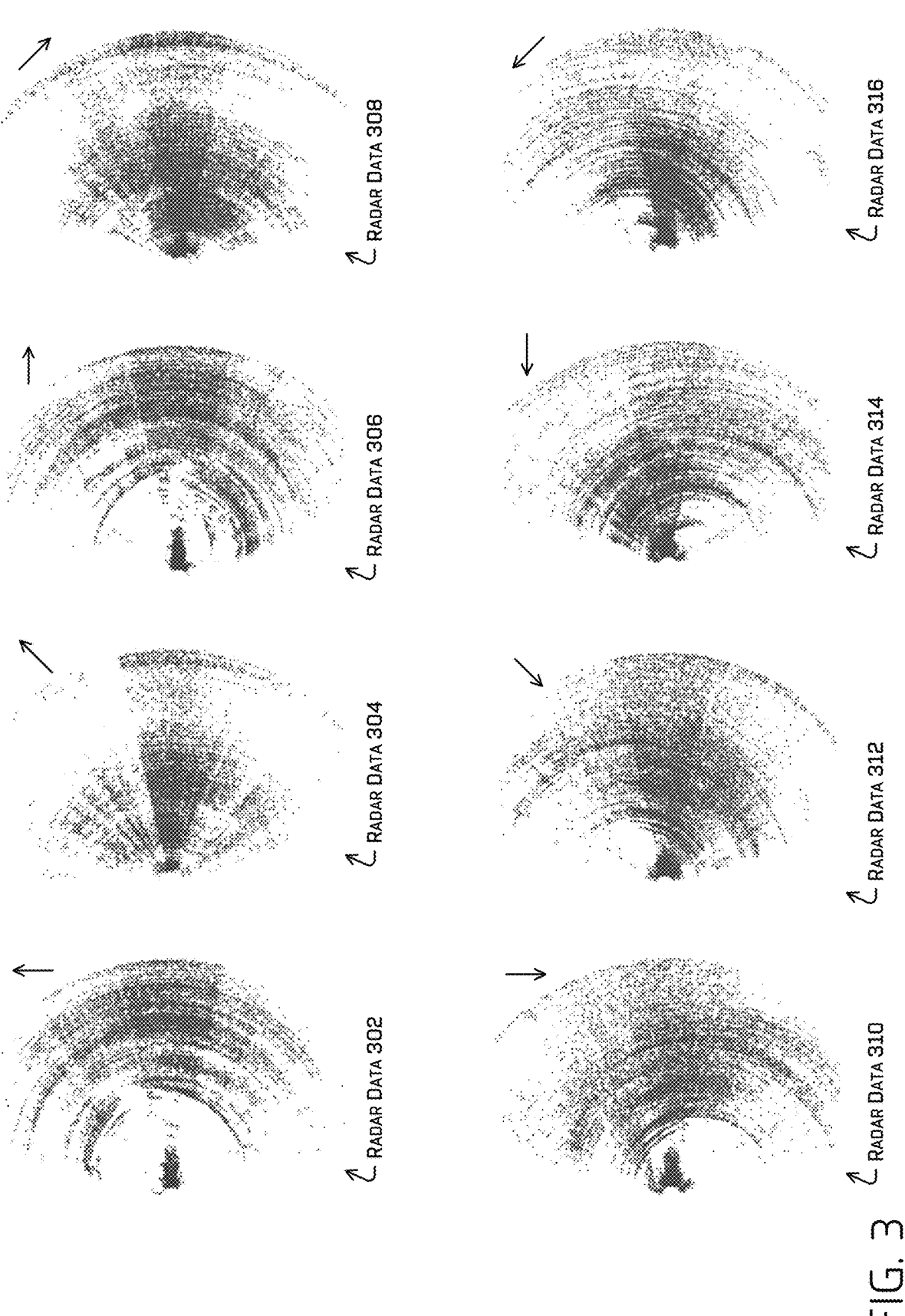
FIG. 3 illustrates a top-down view of radar data generated by a group of radar sensors associated with a vehicle that collectively cover a 360° field of view around the vehicle.

FIG. 3 illustrates a top-down view of radar data produced by eight different radar devices associated with a vehicle 202, i.e., radar data 302, 304, 306, 308, 310, 312, 314, and 316, respectively. The respective orientation of each radar sensor, relative to an orientation of the vehicle, is depicted as an arrow in the upper right of each respective radar device's radar data. The calibration discussed herein may align this different radar data such that two or more portions of different radar data associated with a same portion of the environment overlap.

Example Process

FIGS. 4A-4E illustrate a pictorial flow diagram of an example process 400 for validating and/or modifying a radar sensor alignment. The operations in the process 400 may be used in combination, separately, and/or performed by the same device or different devices. For example, the operations can be implemented by a computing device of an autonomous vehicle 202 and/or a remote computing device (e.g., of a distributed computing service, of a teleoperations system). Hardware and/or software components of a vehicle computing system may be configured to accomplish at least part of the example process 400.

At operation 402, example process 400 may comprise receiving a current sensor alignment, according to any of the techniques discussed herein. The sensor alignment may identify the position and/or orientation of a sensor relative to a common frame of reference, such as a vehicle frame of reference, and/or relative to one or more sensors of the same type. In some examples, the sensor alignment may be associated with radar devices of the vehicle and may indicate the relative positions and/or orientations of those radar devices relative to each other and/or relative to common frame of reference. The current sensor alignment may be an initial sensor alignment or a most recent iteration of the sensor alignment as part of an iterative sensor alignment improvement process.

Figure 4A:
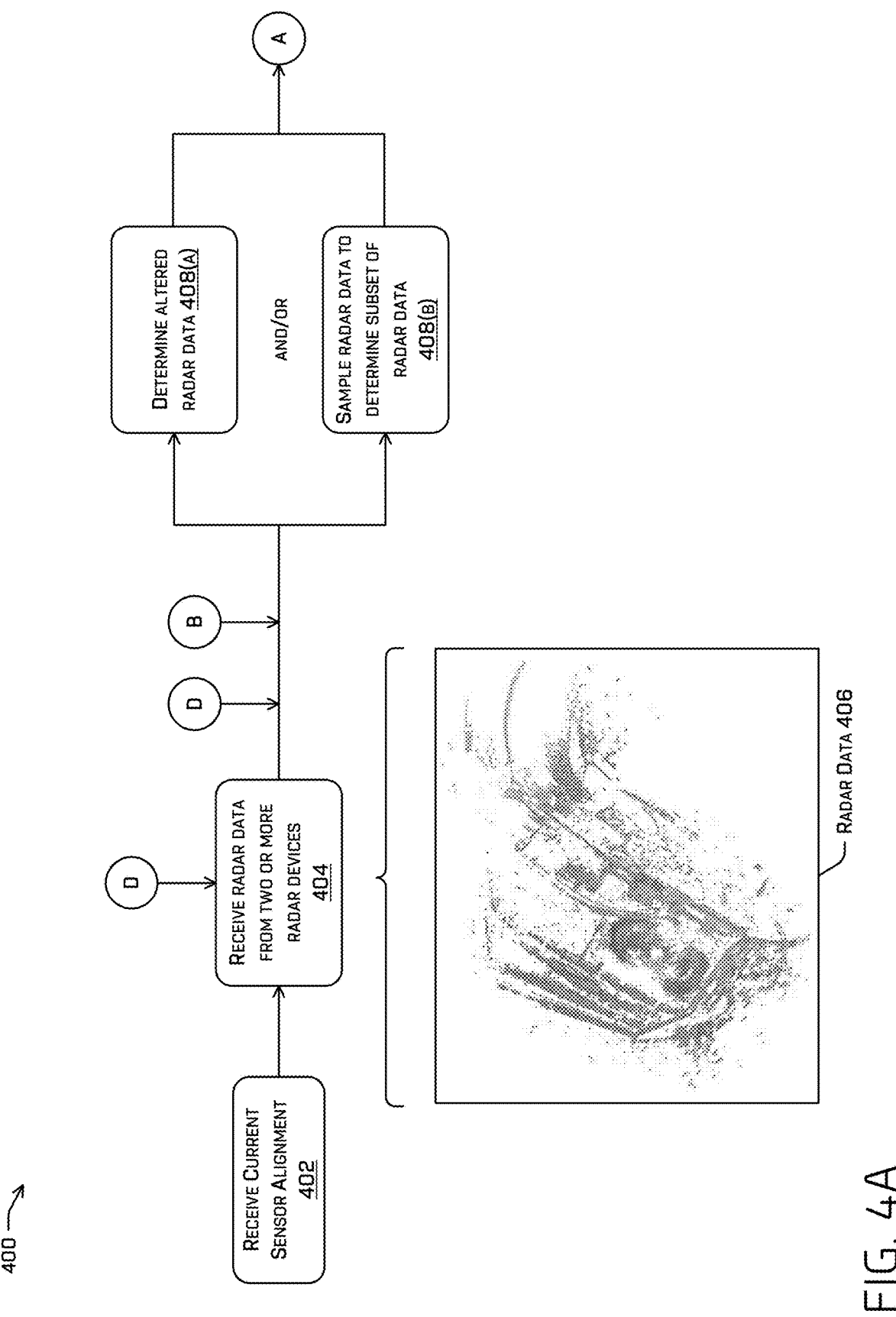
FIGS. 4A-4E illustrate a pictorial flow diagram of an example process for validating and/or modifying a radar sensor alignment.

At operation 404, example process 400 may comprise receiving radar data from two or more radar devices, according to any of the techniques discussed herein. Operation 404 may comprise receiving radar data from up to all of the radar devices associated with the vehicle but may include receiving radar data from at least two radar devices. The radar data may identify which radar device radar data originated from. A first subset of the radar data may be received from a first radar device and a second subset of the radar data may be received by a second radar device. FIG. 4A depicts an example representation of the radar data 406 received from a two or more radar devices. Operation 404 may comprise receiving radar data while the vehicle is stationary or moving. In some examples, the radar data received at operation 404 may be determined to be radar data collected while the vehicle 202 was still or was moving linearly, i.e., no angular velocity, in order to minimize the effect turning may have on Doppler values of the radar data. Of course, in other examples, effects of rotation or other acceleration may be accounted for when performing the techniques described herein. Additionally, or alternatively, operation 404 may comprise receiving radar data from log data stored on the vehicle or retrievable by the vehicle via a network or receiving a most recently received set of radar data from the two or more radar devices. Either way, the radar data may be radar data collected by the radar devices over a few seconds of operation.

Example process 400 may continue to operation 408($a$) and/or operation 408($b$). Operation 408($a$) and 408($b$) both serve to perturb the radar data in different ways so that an updated sensor alignment may be determined from the perturbed radar data. Either operation 408($a$) or 408($b$) may be implemented as part of an iterative process for generating multiple updated sensor alignment, although, in some examples, they may both be used, such as by alternating between operation 408($a$) and operation 408($b$) every q number of iterations, where q is a positive integer. At operation 408($a$), example process 400 may comprise determining altered radar based at least in part on altering the sensor alignment. At operation 408($b$), example process 400 may comprise determining a subset of radar data based at least in part on sampling the radar data within a voxel.

Figure 4B:
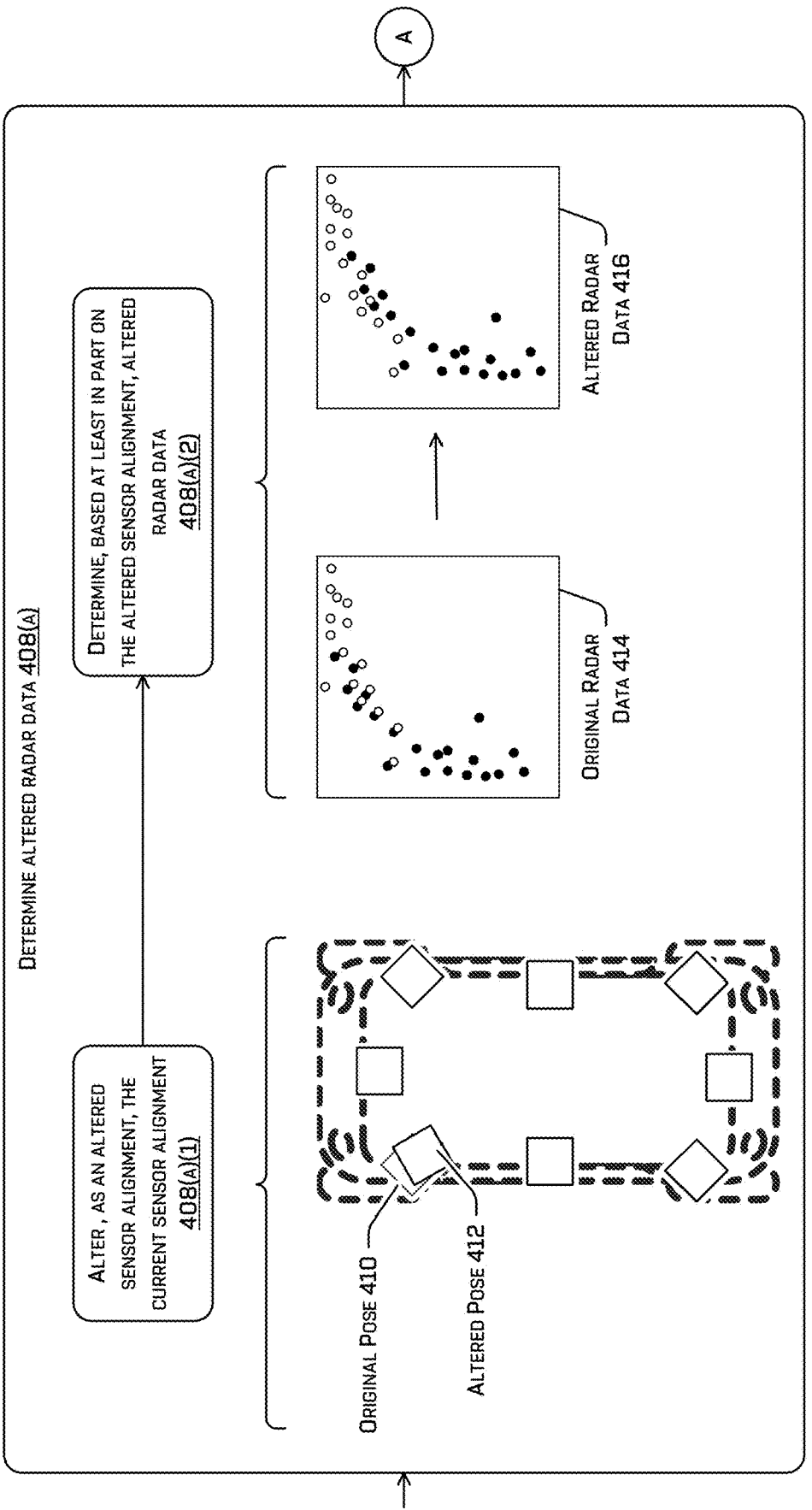

Turning to FIG. 4B, which provides additional details regarding operation 408($a$), at operation 408($a$)(1), operation 408($a$) may comprise altering, as an altered sensor alignment, the current sensor alignment, according to any of the techniques discussed herein. Operation 408($a$)(1) may comprise altering a position and/or orientation of at least one sensor indicated in the current sensor alignment. At least one sensor position and/or orientation may be altered but up to all of the sensor alignments may be altered and alterations to multiple sensor alignments may be independent (e.g., an alteration to one sensor's position and/or orientation doesn't affect other sensor(s)) or may be conducted dependently (e.g., if a front radar device is moved backwards, a back radar device may be moved by a same amount). FIG. 4B illustrates an example current sensor alignment that may indicate an original pose 410 (i.e., position and/or orientation) of a sensor. Operation 408 may include altering this pose by translating (e.g., moving laterally and/or longitudinally) and/or rotating (e.g., changing the yaw, pitch, and/or roll) the original pose 410, resulting in the altered pose 412 of the sensor.

Figure 4C:
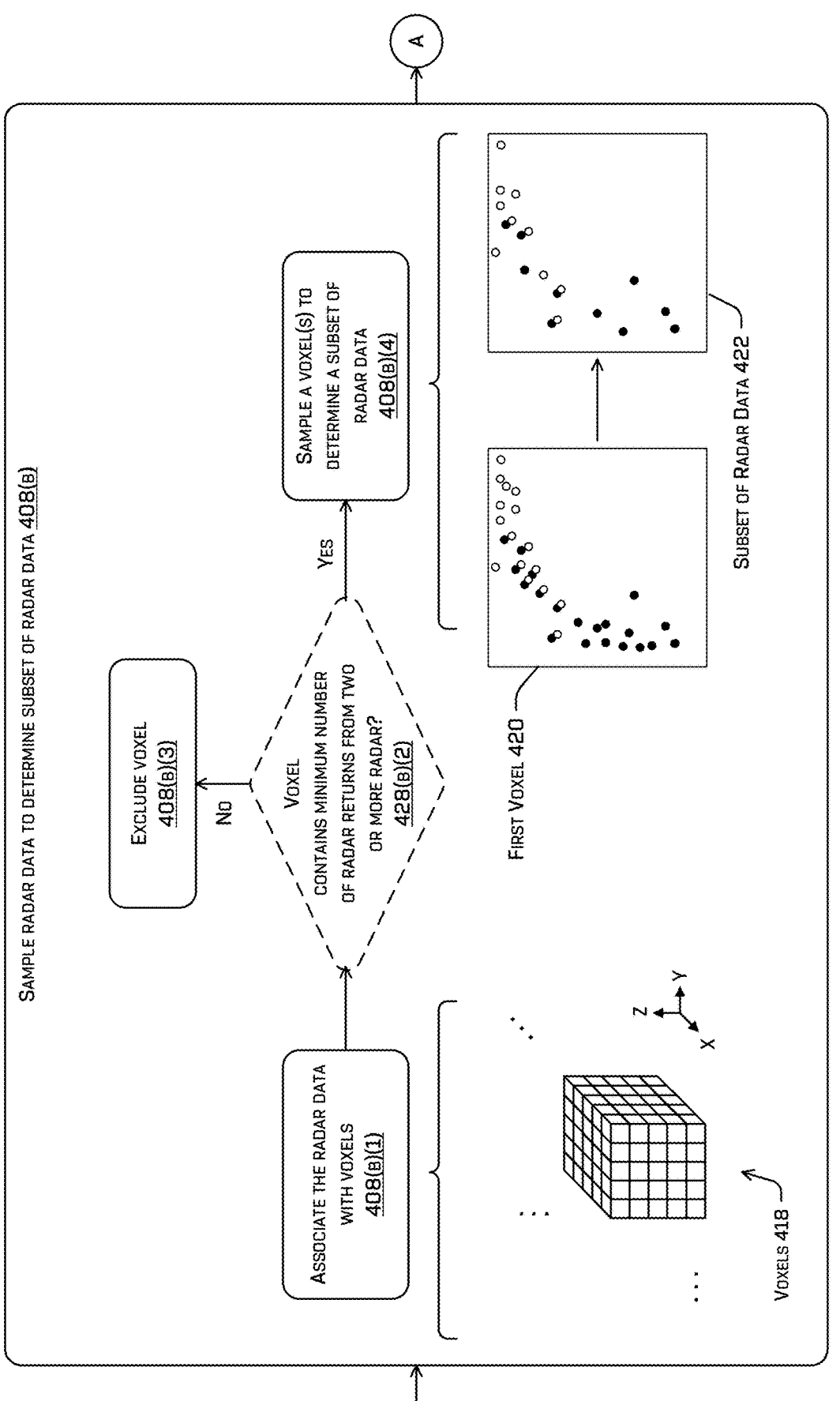
Figure 4D:
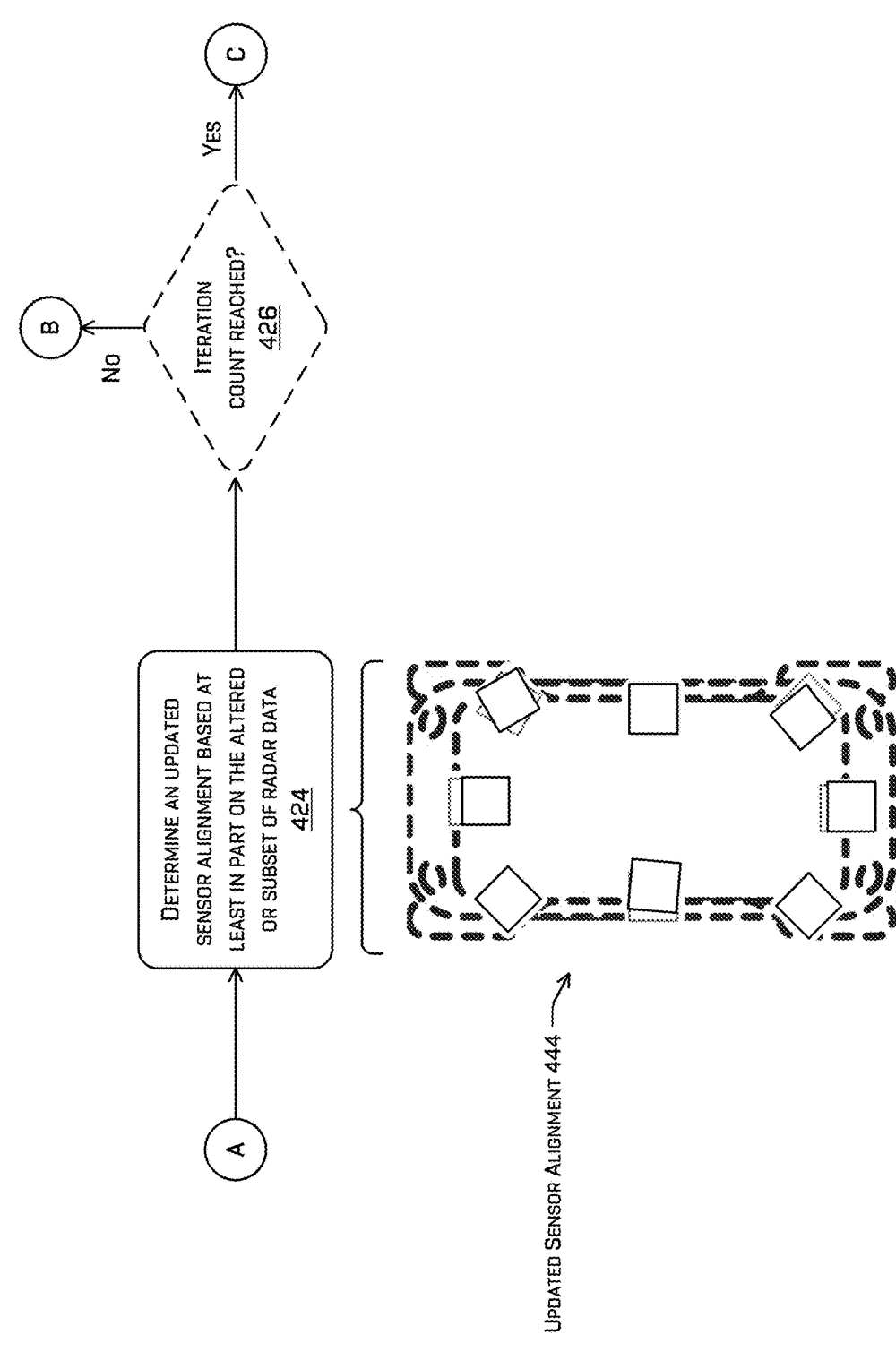

Turning to FIG. 4D, at operation 408(*a*)(2), operation 408(*a*) may comprise determining, based at least in part on the altered sensor alignment, altered radar data. Since at least one of the poses of the sensors was altered at operation 408(*a*)(1), this will affect how the different radar devices' radar data relates to each other. For example, original radar data 414 may have included radar data determined based at least in part on the current sensor alignment. Operation 408(*a*)(2) may comprise determining altered radar data 416 based at least in part on the change in pose indicated in the altered sensor alignment. FIG. 4B depicts first radar data received from a first radar device in filled dots and second radar data received from a second radar device in unfilled dots. Changing the position and/or orientation of a sensor as indicated in the current alignment may result in the change to the original radar data 414 that results in altered radar data 416. Note the new distance between filled dots and unfilled dots in altered radar data 416.

Turning to FIG. 4C, which provides additional details regarding operation 408(*b*), at operation 408(*b*)(1), operation 408(*b*) may comprise associating the radar data with voxels of a voxel space, according to any of the techniques discussed herein. Operation 408(*b*)(1) may include converting a radar data structure into a three-dimensional representation of the received radar data, where the representation includes voxels. Additionally or alternatively, the radar data may be flattened to eliminate an altitude of the radar data and the voxel may, instead, be two-dimensional. In such an example, the voxel space may be a grid and a voxel may, instead, by a portion of that grid. Regardless, returns in the radar data may be associated with a voxel. A voxel may be considered, for simplicity, a three-dimensional pixel, where the altitude of the radar is retained, or may be considered as a two-dimensional pixel, either of which may have dimensions associated therewith that define a volume or area, respectively. An individual voxel may thereby contain radar data from one or more sensors, such as a subset of returns from the radar data. In some examples, an individual voxel may additionally or alternatively be associated with a particular portion of the environment. In various examples, the size and/or shape of the voxels may change from iteration to iteration (e.g., by increasing a size or decreasing a size). FIG. 4C depicts an example representation of a portion of the voxels, including voxels 418, any number of which may contain radar data generated by the one or more radar devices.

At operation 408(*b*)(2), operation 408(*b*) may comprise determining whether a voxel contains a minimum number of radar returns for each radar device for which radar returns exist within the voxel. In other words, operation 408(*b*)(2) may determine whether a number of radar returns from a first radar device within the voxel meet or exceeds a threshold number. Operation 408(*b*)(2) may additionally or alternatively include determining whether at least two radar devices have radar returns within that voxel that meet or exceed the threshold number of returns. This may be repeated over up to all the voxels. If there isn't a sufficient amount of radar data from at least two radar devices within the voxel, operation 408(*b*)(2) may continue to operation 408(*b*)(3), where such a voxel may be excluded from sampling and/or further processing. For voxel(s) that contain a sufficient amount of radar returns from at least two radar devices, operation 408(*b*)(2) may continue to operation 408(*b*)(4). Moreover, for those voxel(s) that contain a sufficient amount of radar returns from at least two radar devices, operation 408(*b*)(2) may further comprise excluding radar returns received from a radar device that aren't great enough in number to meet or exceed the threshold number of returns. For example, a voxel may contain returns from four radar devices, the number of returns for each of the three of those radar devices may meet or exceed the threshold number of returns but a fourth radar device may have less returns in the voxel than the threshold number of returns. The radar data from the fourth radar device may be excluded from further processing, such as at operation 408(*b*)(4), and the radar data from the first, second, and third radar device may be processed at operation 408(*b*)(4).

At operation 408(*b*)(4), operation 408(*b*) may comprise sampling a first voxel to determine a subset of radar data within the voxel. This may be repeated for up to all of the voxels that remain after any exclusions were made at operation 408(*b*)(4). Sampling the voxel may comprise randomly sampling r number of returns from each radar device having returns within the voxel (that weren't excluded from the voxel, as described above). For example, a first voxel 420 may contain radar data from two radar devices, depicted as filled dots and unfilled dots, respectively. In the depicted example, r may be 10, resulting in a subset of radar data 422 comprising 10 randomly determined returns from the first radar device and 10 randomly determined returns from the second radar device. Note that r may be chosen to be lower or significantly higher and may vary based on the voxel size. Additionally or alternatively, r may be scaled linearly based at least in part on a number of radar returns within the voxel. In such a way, and as described in more detail herein, randomized sets of data from a voxel may be used to determine a metric for how well the sensors are aligned.

Turning to FIG. 4D, at operation 424, example process 400 may comprise determining an updated sensor alignment 444 based at least in part on the altered radar data (determined at operation 408(*a*)) or the subset of radar data (determined at operation 408(*b*)), according to any of the techniques discussed herein. Operation 426 may determine the updated sensor alignment using a recalibration method. For example, operation 426 may comprise determining a Renyi's quadratic entropy, or other similar metric indicating a fit of the subsets of radar data, for the altered radar data or the subset of radar data and determining an updated sensor alignment based at least in part on the Renyi's quadratic entropy. For example, operation 426 may include modifying one or more sensor pose(s) to determine the updated sensor alignment that reduce the Renyi's quadratic entropy compared to the original Renyi's quadratic entropy determined for the altered radar data or the subset of radar data. In some examples, determining the Renyi's quadratic entropy may be based at least in part on a probabilistic model that determines a likelihood that two radar returns from different radar sensors are associated with a same feature of the environment based at least in part on a distance between the two radar returns. The updated sensor alignment may identify one or more new position(s) and/or orientation(s) for one or more of the radar devices. Additionally or alternatively, operation 426 may determine a difference between the updated sensor alignment position and/or orientation of a sensor and the original position and/or orientation of that sensor indicated in the current sensor alignment. The updated sensor alignment pose and/or difference from the current sensor alignment may be used as part of the operations discussed further herein.

At operation 426, example process 400 may comprise determining whether an iteration count has been reached, according to any of the techniques discussed herein. In some examples, operations 408(*a*), 408(*b*), and/or 426 may be repeated n times, where n is a positive integer. In some examples, n may be in the tens, hundreds, or thousands. In at least one example, n may be in the thousands. Regardless, if these operations have not been repeated n times, example process 400 may add the updated sensor alignment determined at operation 426 to a database storing all the updated sensor alignments determined so far and/or their respective differences from the current sensor alignment. If the iteration count has been reached, example process 400 may continue to operation 428.

Figure 4E:
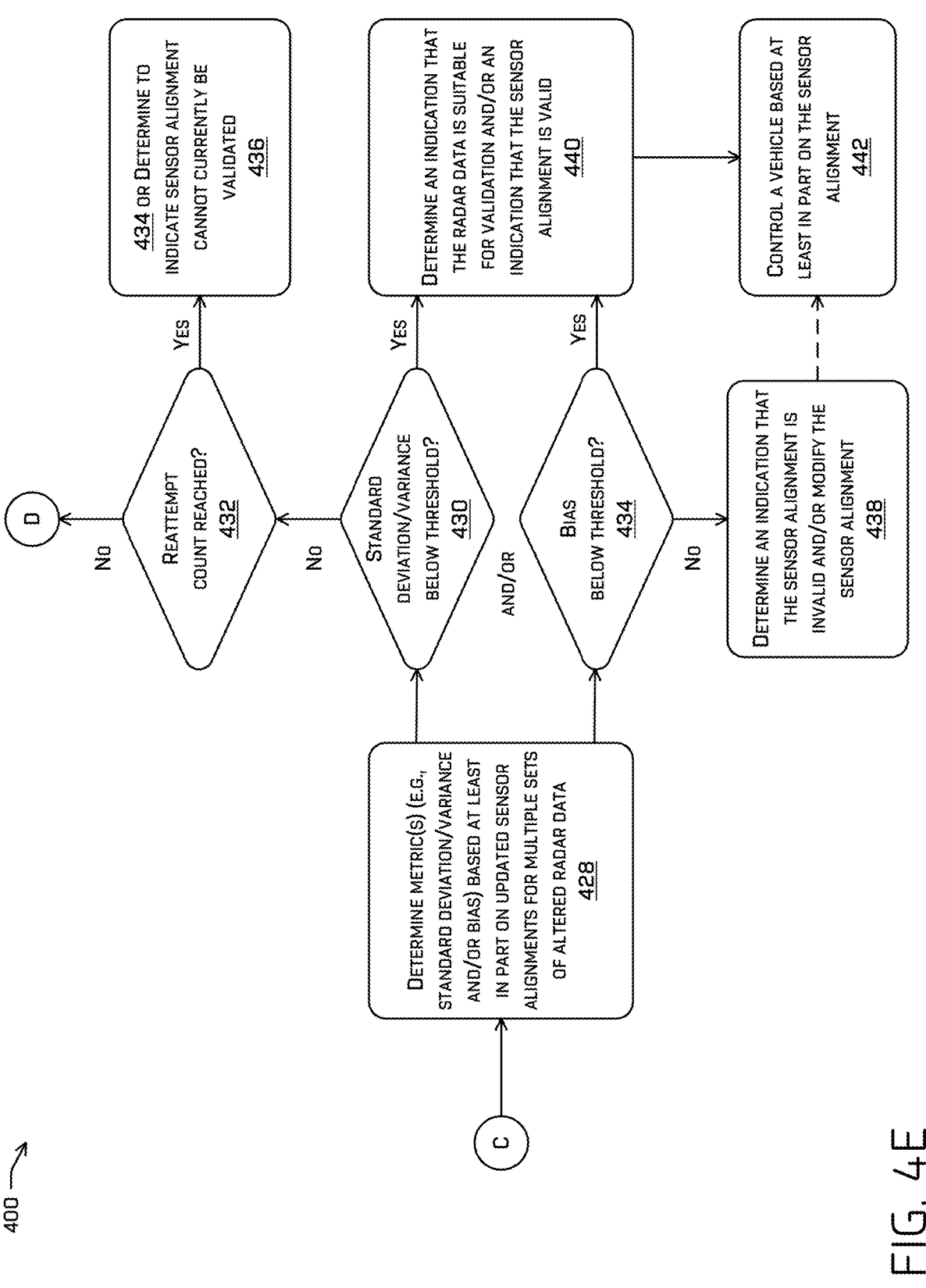

Turning to FIG. 4E, at operation 428, example process 400 may comprise determining metric(s) based at least in part on the updated sensor alignments determined at operation 426 for multiple sets of altered radar data or the subset of radar data (e.g., as a result of repeating operations 408(*a*), 408(*b*), and/or 426 n times), according to any of the techniques discussed herein. In some examples, operation 428 may comprise determining a mean or median, standard deviation, and/or variance of a position and/or orientation for a radar device over the n updated sensor alignments. For example, operation 428 may determine an average position and/or orientation of a first radar device indicated by the n updated sensor alignments and/or a standard deviation and/or variance of the positions and/or orientations indicated by the updated sensor alignments for the first radar device. This may be repeated for up to all the radar devices. Additionally or alternatively, operation 428 may include determining a bias of the poses for a radar device as indicated by the n updated sensor alignments based at least in part on determining a difference between the pose for a radar device indicated by the current sensor alignment and the mean or weighted mean pose of that radar device as determined from the n updated sensor alignments. The bias for each sensor may be averaged to determine an overall bias. Any of this data may be used as a metric by which example process 400 may determine radar data suitability for use in validation and/or the validity of the current sensor alignment. Example process 400 may at least proceed to operation 434 and may additionally or alternatively proceed to operation 430.

At operation 430, example process 400 may comprise determining whether a standard deviation or variance determined at operation 428 of the poses indicated by the updated sensor alignments for a first sensor meets or exceeds a threshold standard deviation or variance, according to any of the techniques discussed herein. For example, the standard deviation or variance may be used as a confidence interval and operation 430 may include determining whether the radar data is suitable for use to validate the current sensor alignment.

If the standard deviation or variance meets or exceeds a threshold standard deviation or variance, the standard deviation or variance may indicate that the radar data is unsuitable for validation. This may be caused by there not being enough radar data, radar data that is corrupted, associated with a portion of the environment that included highly variable features, and/or that features of the radar data itself makes it difficult or impossible to use for validation. If the standard deviation or variance meets or exceeds a threshold standard deviation or variance, example process 400 may continue to operation 432.

At operation 432, example process 400 may comprise determining whether a number (e.g., p reattempts, where p is a positive integer) of reattempts at conducting the validation have been met or exceeded. If the number of reattempts has not been met, example process 400 may continue to operation 404 to collect additional radar data, either by retrieving additional radar from a log or by collecting additional radar data by extending the amount of time radar data is collected or by capturing new radar data at a different time that isn't contiguous with the original radar data. This additional radar data may replace or added to the original radar data and operations 408(*a*), 408(*b*), and/or 426 may be repeated, up to n times, which may result in new metric(s) at operation 428 and a subsequent re-execution of operation 430. Additionally or alternatively, operation 432 may continue to operation(s) 408(*a*) and/or 408(*b*) directly without receiving additional radar data to determine additional altered radar data and/or additional subsets of radar data for which to determine additional updated sensor alignments. If the number of reattempts has been met, example process 400 may continue to operation 434 or may continue to operation 436. At operation 436, example process 400 may comprise determining to indicate that the sensor alignment cannot currently be validated. In such an instance, a vehicle that uses the current sensor alignment may be rerouted for maintenance or rerouted to a safe stopping position.

However, if the standard deviation or variance is below a threshold standard deviation or variance, the techniques may determine an indication that the radar data is suitable for validation. This indication may be stored for auditing purposes and/or continued control of the vehicle using the current sensor alignment may be predicated or based at least in part on this indication.

At operation 434, example process 400 may comprise determining whether the bias is below a threshold bias, according to any of the techniques discussed herein. If the bias meets or exceeds the threshold bias, operation 434 may continue to operation 438, where example process 400 may include determining an indication that the current sensor alignment is invalid. Such an invalidity indication may mean that the current sensor alignment is inaccurate and accordingly inadequate for continued operation of a vehicle using that alignment. In some examples, operation 438 may additionally or alternatively comprise modifying, as a modified sensor alignment, the current sensor alignment by replacing the sensor pose(s) indicated in the current sensor alignment with the mean position(s) and/or orientation(s) of the updated sensor alignments or determining one of the updated sensor alignments associated with a minimum bias or a bias below a bias threshold.

In the latter example, operation 438 may comprise determining a bias associated with a target updated sensor alignment based at least in part on determining a difference between a radar device pose indicated by the target updated sensor alignment and a mean sensor pose determined based at least in part on poses for that radar device indicated by the remaining updated sensor alignments. This may be repeated for all the radar devices indicated by the target updated sensor alignment to determine an average bias for the target updated sensor alignment. An average bias may be determined for up to all the updated sensor alignments or until an average sensor alignment associated with an average bias below the bias threshold is determined. That updated sensor alignment may be used to replace the current sensor alignment as a modified sensor alignment.

This modified sensor alignment may then be used by the vehicle as at least part of controlling operation of the vehicle at operation 442. In an additional or alternate example, determining the indication that the current sensor alignment is invalid may be used to trigger a re-calibration of the sensors to determine a new sensor alignment. Such a recalibration may use the radar data received at operation 402 if a standard deviation or variance determined for the updated sensor alignments is below a threshold standard deviation or variance. In additional or alternate examples, re-calibration may be based at least in part on additional or alternate radar data.

However, if, at operation 434, the bias is determined to be below the threshold bias, example process 400 may continue to operation 440, where example process 400 may determine an indication that the current sensor alignment is valid. In some examples, operation 440 may be additionally or alternatively be based at least in part on an indication that the radar data is suitable for validation, as determined at operation 430. In some examples, the indication that the current sensor validation is valid may be stored for auditing of vehicle operations, such as to identify vehicle hardware and/or software bugs. Example process 400 may continue to operation 442 based at least in part on determining the validity indication.

At operation 442, example process 400 may comprise controlling the vehicle may based at least in part on the current sensor alignment (or the modified sensor alignment as determined at operation 438).

Example Clauses

A: A system comprising: one or more processors; and one or more one or more non-transitory computer-readable media storing processor-executable instructions that, when executed by the one or more processors, cause the system to perform operations comprising: receiving a current sensor alignment identifying a first position and first orientation of a first radar device and a second position and second orientation of a second radar device; receiving radar data from the first radar device and the second radar device; associating the radar data with voxels, wherein a first voxel of the voxels is associated with a portion of an environment; iteratively: determining, based at least in part on the radar data, a subset of the radar data or determining altered radar data; and determining, for an iteration and based at least in part on one of the subset of the radar data or the altered radar data, an updated sensor alignment of a plurality of updated sensor alignments; determining a metric associated with a plurality of updated sensor alignments; either: determining to control a vehicle based at least in part on the current sensor alignment, or modifying, as a modified sensor alignment, the current sensor alignment based at least in part on the metric; and controlling the vehicle based at least in part on the current sensor alignment or the modified sensor alignment.

B: The system of paragraph A, wherein the operations comprise determining the subset of the radar data and wherein determining the subset comprises sampling the voxels to determine a subset of radar data, the sampling including determining a portion of radar returns within the first voxel to include in the subset.

C: The system of either paragraph A or B, wherein the operations comprise determining the altered radar data and where determining the altered radar data comprises: altering the current sensor alignment as an altered sensor alignment, wherein the altered sensor alignment comprises a modification of at least one of the first position or the first orientation of the first radar device; and determining, based at least in part on the altered sensor alignment, altered radar data.

D: The system of any one of paragraphs A-C, wherein: the metric comprises at least one of a variance or a bias of the positions and orientations indicated by the plurality of updated sensor alignments; and determining to control the vehicle based at least in part on the current sensor alignment is based at least in part on at least one of: determining that the variance is below a threshold variance, or determining that the bias is below a threshold bias.

E: The system of paragraph D, wherein: the operations further comprise determining that the current sensor alignment is invalid based at least in part on determining the bias meets or exceeds the threshold bias; and modifying the current sensor alignment is based at least in part on determining that the current sensor alignment is invalid.

F: One or more non-transitory computer-readable media storing processor-executable instructions that, when executed by one or more processors, cause one or more processors to perform operations comprising: receiving a current sensor alignment of two or more radar devices; receiving radar data from the two or more radar devices; iteratively: determining, based at least in part on the radar data, one or more of a subset of the radar data or determining altered radar data; and determining, for an iteration and based at least in part on the subset of the radar data or the altered radar data, an updated sensor alignment of a plurality of updated sensor alignments; determining a metric associated with the plurality of updated sensor alignments; and determining an indication that the radar data is valid or invalid based at least in part on the metric.

G: The one or more non-transitory computer-readable media of paragraph F, wherein: the operations comprise determining the subset of the radar data; the operations further comprise associating the radar data with voxels, wherein a first voxel of the voxels is associated with a portion of an environment; and determining the subset comprises sampling the voxels to determine a subset of radar data, the sampling including determining a portion of radar returns within the first voxel to include in the subset.

H: The one or more non-transitory computer-readable media of either paragraph F or G, wherein the operations comprise determining the altered radar data and where determining the altered radar data comprises: altering the current sensor alignment as an altered sensor alignment, wherein the altered sensor alignment comprises a modification of at least one of the first position or the first orientation of the first radar device; and determining, based at least in part on the altered sensor alignment, altered radar data.

I: The one or more non-transitory computer-readable media of any one of paragraphs F-H, wherein: the metric comprises at least one of a variance or a bias of the positions and orientations indicated by the plurality of updated sensor alignments; and J: The one or more non-transitory computer-readable media of paragraph I, wherein the operations further comprise determining to control a vehicle based at least in part on the current sensor alignment based at least in part on at least one of: determining that the variance is below a threshold variance, or determining that the bias is below a threshold bias.

K: The one or more non-transitory computer-readable media of either paragraph I or J, wherein the operations further comprise at least one of: outputting a first indication that the radar data is valid for validation based at least in part on determining that the variance is below the threshold variance; or outputting a second indication that the current sensor alignment is valid based at least in part on determining that the bias is below the threshold bias.

L: The one or more non-transitory computer-readable media of any one of paragraphs I-K, wherein the operations further comprise at least one of: outputting a first indication that the radar data is unsuitable for validation based at least in part on determining that the variance meets or exceeds the threshold variance; or outputting a second indication that the current sensor alignment is invalid based at least in part on determining that the bias meets or exceeds the threshold bias.

M: The one or more non-transitory computer-readable media of any one of paragraphs I-L, wherein the operations further comprise: determining that the current sensor alignment is invalid based at least in part on determining the bias meets or exceeds the threshold bias; modifying, as a modified sensor alignment, the current sensor alignment based at least in part on determining that the current sensor alignment is invalid; and controlling a vehicle based at least in part on the modified sensor alignment.

N: The one or more non-transitory computer-readable media of any one of paragraphs F-M, wherein the metric comprises a variance of the plurality of updated sensor alignments, and wherein the operations further comprise: determining to receive additional sensor data or determine additional altered radar data based at least in part on the metric meeting or exceeding a threshold variance; and determining new updated sensor alignments and a new metric based at least in part on the additional sensor data or the additional altered radar data.

O: A method comprising: receiving a current sensor alignment of two or more radar devices; receiving radar data from the two or more radar devices; iteratively: determining, based at least in part on the radar data, one or more of a subset of the radar data or determining altered radar data; and determining, for an iteration and based at least in part on the subset of the radar data or the altered radar data, an updated sensor alignment of a plurality of updated sensor alignments; determining a metric associated with the plurality of updated sensor alignments; and determining an indication that the radar data is valid or invalid based at least in part on the metric.

P: The method of paragraph O, wherein: the operations comprise determining the subset of the radar data; the operations further comprise associating the radar data with voxels, wherein a first voxel of the voxels is associated with a portion of an environment; and determining the subset comprises sampling the voxels to determine a subset of radar data, the sampling including determining a portion of radar returns within the first voxel to include in the subset.

Q: The method of either paragraph O or P, wherein the operations comprise determining the altered radar data and where determining the altered radar data comprises: altering the current sensor alignment as an altered sensor alignment, wherein the altered sensor alignment comprises a modification of at least one of the first position or the first orientation of the first radar device; and determining, based at least in part on the altered sensor alignment, altered radar data.

R: The method of any one of paragraphs O-Q, wherein: the metric comprises at least one of a variance or a bias of the positions and orientations indicated by the plurality of updated sensor alignments; and S: The method of paragraph R, wherein the operations further comprise determining to control a vehicle based at least in part on the current sensor alignment based at least in part on at least one of: determining that the variance is below a threshold variance, or determining that the bias is below a threshold bias.

T: The method of either paragraph R or S, wherein the operations further comprise: determining that the current sensor alignment is invalid based at least in part on determining the bias meets or exceeds the threshold bias; modifying, as a modified sensor alignment, the current sensor alignment based at least in part on determining that the current sensor alignment is invalid; and controlling a vehicle based at least in part on the modified sensor alignment.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. Such processes, or any portion thereof, may be performed iteratively in that any or all of the steps may be repeated. Of course, the disclosure is not meant to be so limiting and, as such, any process performed iteratively may comprise, in some examples, performance of the steps a single time.

Conditional language such as, among others, "may," "could," "may" or "might," unless specifically stated otherwise, are understood within the context to indicate that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a,"

"an" or other similar articles means singular and/or plural. When referring to a collection of item as a "set," it should be understood that the definition may include, but is not limited to, the common understanding of the term in mathematics to include any number of items including a null set (0), 1, 2, 3, . . . up to and including an infinite set.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
one or more processors; and
one or more non-transitory computer-readable media storing processor-executable instructions that, when executed by the one or more processors, cause the system to perform operations comprising:
receiving a current sensor alignment identifying a first position and first orientation of a first radar device and a second position and second orientation of a second radar device;
receiving radar data from the first radar device and the second radar device;
associating the radar data with voxels, wherein a first voxel of the voxels is associated with a portion of an environment;
iteratively:
determining, based at least in part on the radar data, a subset of the radar data or determining altered radar data; and
determining, for an iteration and based at least in part on one of the subset of the radar data or the altered radar data, an updated sensor alignment of a plurality of updated sensor alignments;
determining a metric associated with the plurality of updated sensor alignments;
either:
determining to control a vehicle based at least in part on the current sensor alignment, or
modifying, as a modified sensor alignment, the current sensor alignment based at least in part on the metric; and
controlling the vehicle based at least in part on the current sensor alignment or the modified sensor alignment.

2. The system of claim 1, wherein the operations comprise determining the subset of the radar data and wherein determining the subset comprises sampling the voxels to determine a subset of radar data, the sampling including determining a portion of radar returns within the first voxel to include in the subset.

3. The system of claim 1, wherein the operations comprise determining the altered radar data and where determining the altered radar data comprises:
altering the current sensor alignment as an altered sensor alignment, wherein the altered sensor alignment comprises a modification of at least one of the first position or the first orientation of the first radar device; and
determining, based at least in part on the altered sensor alignment, the altered radar data.

4. The system of claim 1, wherein:
the metric comprises at least one of a variance or a bias of positions and orientations indicated by the plurality of updated sensor alignments; and
determining to control the vehicle based at least in part on the current sensor alignment is based at least in part on at least one of:
determining that the variance is below a threshold variance, or
determining that the bias is below a threshold bias.

5. The system of claim 4, wherein:
the operations further comprise determining that the current sensor alignment is invalid based at least in part on determining the bias meets or exceeds the threshold bias; and
modifying the current sensor alignment is based at least in part on determining that the current sensor alignment is invalid.

6. One or more non-transitory computer-readable media storing processor-executable instructions that, when executed by one or more processors, cause the one or more processors to perform operations comprising:
receiving a current sensor alignment of two or more radar devices;
receiving radar data from the two or more radar devices;
iteratively:
determining, based at least in part on the radar data, one or more of a subset of the radar data or determining altered radar data; and
determining, for an iteration and based at least in part on the subset of the radar data or the altered radar data, an updated sensor alignment of a plurality of updated sensor alignments;
determining a metric associated with the plurality of updated sensor alignments; and
determining an indication that the radar data is valid or invalid based at least in part on the metric.

7. The one or more non-transitory computer-readable media of claim 6, wherein:
the operations comprise determining the subset of the radar data;
the operations further comprise associating the radar data with voxels, wherein a first voxel of the voxels is associated with a portion of an environment; and
determining the subset comprises sampling the voxels to determine a subset of radar data, the sampling including determining a portion of radar returns within the first voxel to include in the subset.

8. The one or more non-transitory computer-readable media of claim 6, wherein the operations comprise determining the altered radar data and where determining the altered radar data comprises:
altering the current sensor alignment as an altered sensor alignment, wherein the altered sensor alignment comprises a modification of at least one of a first position or a first orientation of a first radar device; and determining, based at least in part on the altered sensor alignment, the altered radar data.

9. The one or more non-transitory computer-readable media of claim 6, wherein:

the metric comprises at least one of a variance or a bias of positions and orientations indicated by the plurality of updated sensor alignments.

10. The one or more non-transitory computer-readable media of claim 9, wherein the operations further comprise determining to control a vehicle based at least in part on the current sensor alignment based at least in part on at least one of:

determining that the variance is below a threshold variance, or determining that the bias is below a threshold bias.

11. The one or more non-transitory computer-readable media of claim 9, wherein the operations further comprise at least one of:

outputting a first indication that the radar data is valid for validation based at least in part on determining that the variance is below a threshold variance; or outputting a second indication that the current sensor alignment is valid based at least in part on determining that the bias is below a threshold bias.

12. The one or more non-transitory computer-readable media of claim 9, wherein the operations further comprise at least one of:

outputting a first indication that the radar data is unsuitable for validation based at least in part on determining that the variance meets or exceeds a threshold variance; or outputting a second indication that the current sensor alignment is invalid based at least in part on determining that the bias meets or exceeds a threshold bias.

13. The one or more non-transitory computer-readable media of claim 9, wherein the operations further comprise:

determining that the current sensor alignment is invalid based at least in part on determining the bias meets or exceeds a threshold bias;

modifying, as a modified sensor alignment, the current sensor alignment based at least in part on determining that the current sensor alignment is invalid; and controlling a vehicle based at least in part on the modified sensor alignment.

14. The one or more non-transitory computer-readable media of claim 6, wherein the metric comprises a variance of the plurality of updated sensor alignments, and wherein the operations further comprise:

determining to receive additional sensor data or determine additional altered radar data based at least in part on the metric meeting or exceeding a threshold variance; and determining new updated sensor alignments and a new metric based at least in part on the additional sensor data or the additional altered radar data.

15. A method comprising:

receiving a current sensor alignment of two or more radar devices;

receiving radar data from the two or more radar devices; iteratively:

determining, based at least in part on the radar data, one or more of a subset of the radar data or determining altered radar data; and determining, for an iteration and based at least in part on the subset of the radar data or the altered radar data, an updated sensor alignment of a plurality of updated sensor alignments;

determining a metric associated with the plurality of updated sensor alignments; and determining an indication that the radar data is valid or invalid based at least in part on the metric.

16. The method of claim 15, further comprising:

determining the subset of the radar data;

associating the radar data with voxels, wherein a first voxel of the voxels is associated with a portion of an environment; and determining the subset comprises sampling the voxels to determine a subset of radar data, the sampling including determining a portion of radar returns within the first voxel to include in the subset.

17. The method of claim 15, further comprising determining the altered radar data and where determining the altered radar data comprises:

altering the current sensor alignment as an altered sensor alignment, wherein the altered sensor alignment comprises a modification of at least one of a first position or a first orientation of a first radar device; and determining, based at least in part on the altered sensor alignment, the altered radar data.

18. The method of claim 15, wherein:

the metric comprises at least one of a variance or a bias of positions and orientations indicated by the plurality of updated sensor alignments.

19. The method of claim 18, further comprising determining to control a vehicle based at least in part on the current sensor alignment based at least in part on at least one of:

determining that the variance is below a threshold variance, or determining that the bias is below a threshold bias.

20. The method of claim 18, further comprising:

determining that the current sensor alignment is invalid based at least in part on determining the bias meets or exceeds a threshold bias;

modifying, as a modified sensor alignment, the current sensor alignment based at least in part on determining that the current sensor alignment is invalid; and controlling a vehicle based at least in part on the modified sensor alignment.

* * * * *